Patented Sept. 19, 1950

2,522,959

UNITED STATES PATENT OFFICE 2,522,959

2,2-DINITRO-1,3-PROPANEDIOL AND METHOD OF PREPARING SAME

Herman Plaut, Los Angeles, Calif., assignor to Aerojet Engineering Corporation, Azusa, Calif., a corporation of Delaware No Drawing. Application January 22, 1949, Serial No. 72,257

3 Claims. (Cl. 260—635)

This invention relates to a new composition of matter and in particular to a new organic nitro compound.

The object of this invention is to provide an organic nitro compound containing two nitro groups in the molecule and having at least two other functional groups associated therewith; the particular functional group in this compound being hydroxyl groups.

A further object of the invention is to provide processes for synthesizing this type of compound.

Heretofore several attempts have been made to synthesize an organic compound having two nitro groups in the molecule in combination with other functional groups, but up to the present time no substance, having the structure disclosed by my invention, has been available.

According to my invention, I have succeeded in making a compound having the formula:

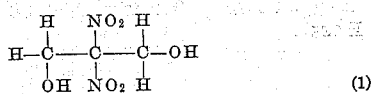

(1)

This compound can be synthesized in general by admixing one molecular weight portion of formaldehyde with one molecular weight portion of a class of compounds represented by the general formula:

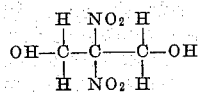

(2)

where M may comprise any cation and it is understood that only one of its valences appears in the formula. Usually, the alkali metals and the alkaline-earth metals are preferred, since their salts are not as sensitive to detonation by shock or heat as would be the salts of the heavy metals. The class of compounds shown in the formula (2) above was first prepared by Duden and Ponndorf.

The mixture of the formaldehyde and the compound, corresponding to the formula shown above, is then treated with one molecular weight portion of a weak acid such as organic aliphatic acids examples of which are acetic acid, proprionic acid, etc. The resulting clear solution is then extracted with an appropriate solvent and the extracts are dried over an inert drying agent such as anhydrous sodium sulphate or silica gel.

The solvent is then removed by evaporation at reduced pressure leaving behind a residue which may be further purified by recrystallization.

The synthesis of the compound having the formula

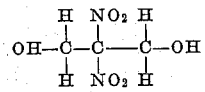

may be accomplished by two methods. The first method is that in which a salt of dinitroethanol is used. The second method of preparing the substance is as follows: One mole of a salt of dinitromethane and two moles of formaldehyde are reacted without requiring the step of isolating the salt of dinitroethanol as in the first example.

The following examples are included to show the method by which the synthesis of the above compound may be carried out, however, it is not intended that this invention should be limited to such examples but will include such modifications as are recognized by those skilled in the art to be equivalents of those set forth below.

EXAMPLE I

*Formation of 2,2-dinitro-1,3-propanediol*

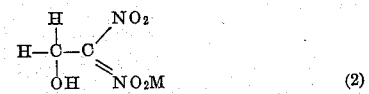

One mole (174 gms.) of potassium salt of dinitroethanol, formed by reacting one mole of the dipotassium salt of dinitromethane with one mole of formaldehyde, is suspended in 400 ml. portions of water at room temperature. Formaldehyde (1.1 moles) is added to this aqueous suspension. The mixture is then warmed to 25-30° C. and over a one hour period 120 gms. of 50% acetic acid solution in water (one mole of acetic acid) are added with constant agitation. The temperature is maintained between 25-30° C. throughout the period. Agitation is continued for an additional one hour after all of the acid has been added. The reaction mixture is then extracted four times with 125 ml. portions of ethyl ether. The ether extracts are combined and dried over anhydrous sodium sulphate. When thoroughly dried the ether is removed by evaporation at reduced pressure leaving behind a semi-crystalline residue. This residue may be further purified by dissolving it in an equal volume of 1-chloro-1-nitroethane and warming the mixture to cause solution. When the solution cools large crystals separate out. Two volumes of chloroform are then added to obtain a further yield of the pure material from the solution. White flakes of 2,2-dinitro-1,3-propanediol melt between 138–140° C. An ultimate analysis of the crystal residue shows that it has the same percentage of nitrogen as the calculated value of the nitrogen content in 2,2-dinitro-1,3-propanediol.

EXAMPLE II

*Alternate formation of 2,2-dinitro-1,3-propanediol*

One mole of the dipotassium salt of the dinitromethane (182 gms.) is suspended in 400 ml. of water. 2.2 moles of formaldehyde in the form of an aqueous solution are added all at once and agitation is commenced. The temperature is adjusted and maintained between 25–30° C. for the duration of the reaction.

A solution of 120 gms. of 50% acetic acid (1 mole) in water is added over approximately a one hour period. Agitation is maintained for an additional hour after the addition of the acid is completed. From this point on the procedure is identical to that shown in Example I for separating the pure dinitropropanediol.

It is apparent that the compound made possible by my invention provides an interesting intermediate which is suitable as a starting point for the preparation of a large number of new substances due to the fact that this compound possesses two functional groups in conjunction with the two nitro groups.

I claim:

1. A new composition of matter comprising 2,2-dinitro-1,3-propanediol

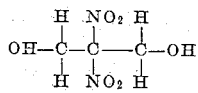

2. A method for preparing a composition of matter having the formula

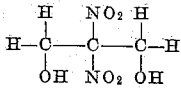

which comprises admixing one mole of a salt of dinitromethane with one mole of formaldehyde forming a compound having the formula

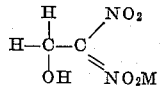

in which M represents one valence of any cation, treating the said reaction product with one mole of formaldehyde and acidifying the mixture with a weak acid selected from the group consisting of acetic acid and propionic acid, while agitating the solution, extracting the 2,2-dinitro-1,3-propanediol from the solution with a suitable solvent, drying the extract, and removing the solvent by evaporation under reduced pressure.

3. A method for forming a composition of matter having the formula

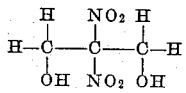

which comprises admixing one mole of a salt of dinitromethane with two moles of formaldehyde and acidifying the mixture with a weak acid selected from the group consisting of acetic acid and propionic acid, while agitating the solution, extracting the 2,2-dinitro-1,3-propandiol from the solution with a suitable solvent, drying the extract, and removing the solvent by evaporation under reduced pressure.

HERMAN PLAUT.

REFERENCES CITED

The following references are of record in the file of this patent:

UNITED STATES PATENTS

| Number | Name | Date |
|---|---|---|
| 2,132,330 | Vanderbilt | Oct. 4, 1938 |
| 2,139,120 | Hass et al. | Dec. 6, 1938 |
| 2,387,019 | Hass et al. | Oct. 16, 1945 |

OTHER REFERENCES

Journal of Industrial and Engineering Chemistry, January, 1940, pages 34–38 (Vanderbilt and Hass).